United States Patent
Scheibe

(10) Patent No.: US 9,536,463 B2
(45) Date of Patent: Jan. 3, 2017

(54) METHOD FOR FAULT-HEALING IN A LIGHT EMITTING DIODE (LED) BASED DISPLAY

(75) Inventor: Paul O. Scheibe, Arroyo Grande, CA (US)

(73) Assignee: LANDMARK SCREENS, LLC, Palo Alto, CA (US)

( * ) Notice: Subject to any disclaimer, the term of this patent is extended or adjusted under 35 U.S.C. 154(b) by 1812 days.

(21) Appl. No.: 11/836,110

(22) Filed: Aug. 8, 2007

(65) Prior Publication Data
US 2009/0040153 A1    Feb. 12, 2009

(51) Int. Cl.
G09G 5/02 (2006.01)
G09G 3/20 (2006.01)
G06F 3/14 (2006.01)
G09G 3/14 (2006.01)

(52) U.S. Cl.
CPC .......... *G09G 3/2003* (2013.01); *G06F 3/1446* (2013.01); *G09G 3/14* (2013.01); *G09G 2320/0295* (2013.01); *G09G 2320/0666* (2013.01); *G09G 2330/10* (2013.01)

(58) Field of Classification Search
USPC ............................ 345/83, 90, 204; 315/169.3
See application file for complete search history.

(56) References Cited

U.S. PATENT DOCUMENTS

| | | |
|---|---|---|
| 3,906,197 A | 9/1975 | Grover |
| 4,128,760 A | 12/1978 | Del Signore, II |
| 4,800,375 A * | 1/1989 | Silverstein ........ G02F 1/133514 345/694 |
| 5,299,291 A | 3/1994 | Ruetz |

(Continued)

FOREIGN PATENT DOCUMENTS

| | | |
|---|---|---|
| CN | 1498341 A | 5/2004 |
| CN | 1781135 A | 5/2006 |

(Continued)

OTHER PUBLICATIONS

Matsuda, H. et al. "Appearance-Consistent Projector Tolerant of Various Colored Projection Surfaces and Ambient Light" 2004 SID International Symposium Digest of Technical Papers. May 25-27, 2004, vol. 35, No. 2.

(Continued)

*Primary Examiner* — Carolyn R Edwards
(74) *Attorney, Agent, or Firm* — VLP Law Group LLP; Edward C. Kwok

(57) ABSTRACT

A method to be used in a light emitting diode (LED) display provides a fault-healing capability. The method is applicable to a display having pixels made up of LEDs of four or more primary colors. For each pixel, the method receives a signal specifying a light intensity and a color to be displayed and detects if a fault exists in an LED of one or more of the primary colors. When no fault is detected, the LEDs of the pixel are driven with currents to achieve the specified light intensity and color. Otherwise, the LEDs of the pixel are driven in the primary colors that are without fault, using a combination of currents to achieve the specified light intensity and color. The combination of currents is derived by finding a position of the specified color in a chromaticity diagram and, using that position, deriving the currents to drive the LEDs in the primary colors without fault.

6 Claims, 8 Drawing Sheets

(56) References Cited

U.S. PATENT DOCUMENTS

| | | | |
|---|---|---|---|
| 5,303,072 A * | 4/1994 | Takeda | G02F 1/13624 |
| | | | 349/38 |
| 5,384,901 A | 1/1995 | Glassner et al. | |
| 5,434,860 A | 7/1995 | Riddle | |
| 5,523,769 A | 6/1996 | Lauer et al. | |
| 5,831,374 A | 11/1998 | Morita et al. | |
| 5,875,260 A | 2/1999 | Ohta | |
| 6,045,240 A | 4/2000 | Hochstein | |
| 6,169,632 B1 | 1/2001 | Kurtenbach | |
| 6,229,508 B1 | 5/2001 | Kane | |
| 6,570,559 B1 | 5/2003 | Oshima | |
| 6,639,574 B2 | 10/2003 | Scheibe | |
| 6,765,586 B2 | 7/2004 | Yamazaki et al. | |
| 6,819,458 B1 | 11/2004 | Tanaka et al. | |
| 6,937,249 B2 | 8/2005 | Herbert et al. | |
| 7,079,155 B2 | 7/2006 | Kanai | |
| 7,408,558 B2 | 8/2008 | Madden et al. | |
| 7,614,753 B2 | 11/2009 | Zavarehi et al. | |
| 7,898,706 B2 | 3/2011 | Ramanath | |
| 2002/0047565 A1 * | 4/2002 | Nara | G09G 3/006 |
| | | | 315/169.3 |
| 2002/0165630 A1 | 11/2002 | Arthur et al. | |
| 2003/0011613 A1 | 1/2003 | Booth, Jr. | |
| 2003/0128174 A1 | 7/2003 | Scheibe | |
| 2003/0135784 A1 | 7/2003 | Yamaguchi et al. | |
| 2003/0169341 A1 | 9/2003 | Kanai | |
| 2004/0113875 A1 | 6/2004 | Miller et al. | |
| 2004/0233218 A1 | 11/2004 | Shin et al. | |
| 2005/0031199 A1 | 2/2005 | Ben-Chorin et al. | |
| 2005/0052374 A1 | 3/2005 | Devos et al. | |
| 2005/0068268 A1 | 3/2005 | Song et al. | |
| 2005/0088380 A1 | 4/2005 | Bulovic et al. | |
| 2005/0179675 A1 * | 8/2005 | Hekstra | G09G 3/2003 |
| | | | 345/204 |
| 2005/0276474 A1 | 12/2005 | Um et al. | |
| 2006/0061527 A1 | 3/2006 | Peng et al. | |
| 2006/0098077 A1 | 5/2006 | Dowling | |
| 2006/0158881 A1 | 7/2006 | Dowling | |
| 2006/0227085 A1 * | 10/2006 | Boldt et al. | 345/83 |
| 2006/0262224 A1 | 11/2006 | Ha et al. | |
| 2007/0081102 A1 | 4/2007 | Ramanath et al. | |
| 2007/0085790 A1 | 4/2007 | Chung | |
| 2007/0091435 A1 | 4/2007 | Garner et al. | |
| 2007/0110304 A1 | 5/2007 | Tsukada | |
| 2007/0126657 A1 | 6/2007 | Kimpe | |
| 2007/0139437 A1 | 6/2007 | Boroson et al. | |
| 2007/0216637 A1 | 9/2007 | Ito | |

FOREIGN PATENT DOCUMENTS

| | | |
|---|---|---|
| EP | 0 878 788 | 11/1998 |
| EP | 1 734 502 A | 12/2006 |
| EP | 1734502 A1 | 12/2006 |
| WO | WO02/089539 | 11/2002 |
| WO | 02099557 A2 | 12/2002 |
| WO | WO 2006/085274 | 8/2006 |
| WO | 2007/020406 | 2/2007 |
| WO | 2007/020406 A2 | 2/2007 |
| WO | 2007042984 A1 | 4/2007 |

OTHER PUBLICATIONS

PCT International Search Report for International Application No. PCT/US2008/072269, 3 pages.
PCT Written Opinion of the International Searching Authority for International Application No. PCT/US2008/072269, 6 pages.
PCT International Search Report for International Application No. PCT/US2008/072270, 3 pages.
PCT Written Opinion of the International Searching Authority for International Application No. PCT/US2008/072270, 5 pages.
PCT International Search Report for International Application No. PCT/US2008/072273, 3 pages.
PCT Written Opinion of the International Searching Authority for International Application No. PCT/US2008/072273, 5 pages.
PCT International Search Report for International Application No. PCT/US2008/072282, 3 pages.
PCT Written Opinion of the International Searching Authority for International Application No. PCT/US2008/072282, 5 pages.
PCT International Search Report for International Application No. PCT/US2008/072279, dated Apr. 21, 2009, 3 pages.
PCT Written Opinion of the International Searching Authority for International Application No. PCT/US2008/072279, dated Apr. 21, 2009, 8 pages.
PCT International Search Report for International Application No. PCT/US2008/072277, 4 pages.
PCT Written Opinion of the International Searching Authority for International Application No. PCT/US2008/072277, 6 pages.
PCT International Search Report for International Application No. PCT/US2008/072271, 4 pages.
PCT Written Opinion of the International Searching Authority for International Application No. PCT/US2008/072271, 6 pages.
Takeyuji Ajito et al. "Color Conversion Method for Multiprimary Display Using Matrix Switching" Optical Review, Springer, Berlin, DE, vol. 8, No. 3, May 1, 2001, pp. 191-197, XP019353885, 7 pages.
PCT International Search Report for International Application No. PCT/US2008/072281, 3 pages.
PCT Written Opinion of the International Searching Authority for International Application No. PCT/US2008/072281, 5 pages.
Chinese Office Action, application No. 200880101821.7, dated Jul. 20, 2012, pp. 1-6.
Chinese Office Action, application No. 200880101822.1, dated Mar. 30, 2012, pp. 1-4.
EP Comunication, application No. 08 782 632.7-2205, dated Aug. 9, 2012, pp. 1-6.
Chinese Office Action, application No. 200880101821.7, dated Mar. 12, 2012, p. 1.
Chinese Office Action for Application No. 200880101821.7 dated Mar. 28, 2013 with English Translation, 7 pgs.
Chinese Rejection Decision with English Translation for Chinese Patent Application No. 200880101821.7 dated Oct. 14, 2013.
Wyszecki, Gunter, et al., Color Science Concepts and Methods, Quantitative Data and Formulae, $2^{nd}$ Edition, John Wiley & Sons, 1982, pp. 130-248.

* cited by examiner

METHOD FOR FAULT-HEALING IN A LIGHT EMITTING DIODE (LED) BASED DISPLAY

CROSS REFERENCE TO RELATED APPLICATIONS

The present invention is also related to (a) U.S. Non-Provisional patent application Ser. No. 11/836,104, entitled "Method for Compensating for A Chromaticity Shift Due to Ambient Light in An Electronic Signboard," filed Aug. 8, 2007; (b) U.S. Non-Provisional patent application Ser. No. 11/836,114, now U.S. Pat. No. 8,243,090, issued Aug. 14, 2012, entitled "Method for Mapping A Color Specified Using A Smaller Color Gamut To A Larger Color Gamut," filed Aug. 8, 2007; (c) U.S. Non-Provisional patent application Ser. No. 11/836,116, now U.S. Pat. No. 9,262,118, issued Feb. 16, 2016, entitled "Graphical Display Comprising A Plurality Of Modules Each Controlling A Group Of Pixels Corresponding To A Portion Of The Graphical Display," filed Aug. 8, 2007; (d) U.S. Non-Provisional patent application Ser. No. 11/836,117, entitled "Method for Displaying a Single Image for Diagnostic Purpose without Interrupting an Observer's Perception of the Display of a Sequence of Images," filed Aug. 8, 2007; (e) U.S. Non-Provisional patent application Ser. No. 11/836,120, now U.S. Pat. No. 7,768,180, issued Aug. 3, 2010, entitled "Enclosure for Housing a Plurality of Pixels of a Graphical Display," filed Aug 8, 2007; (f) U.S. Non-Provisional patent application Ser. No. 11/836,122, now U.S. Pat. No. 9,342,266, issued May 17, 2016, entitled "Apparatus for Dynamically Circumventing Faults in the Light Emitting Diodes (LEDS) of a Pixel in a Graphical Display," filed Aug. 8, 2007; and (g) U.S. Non-Provisional patent application Ser. No. 11/836,125, entitled "Method for Computing Drive Currents for a Plurality of LEDs in a Pixel of a Signboard to Achieve a Desired Color at a Desired Luminous Intensity," filed Aug. 8, 2007.

The disclosures of the patent applications listed above are hereby incorporated by reference in their entireties.

BACKGROUND OF THE INVENTION

1. Field of the Invention

The present invention relates to light-emitting diode (LED) based signboards. In particular, the present invention relates to increasing both functionality and reliability of such LED-based signboards.

2. Discussion of the Related Art

Light emitting diodes (LEDs) produce most of the active images shown on modern advertising structures. A large number of LEDs (e.g., hundreds of thousands to millions) are used on a typical signboard to produce a multicolored image. Thus, the reliability of both the pixels formed from groups of LEDs and their associated electronics is an important design consideration. Thus, it is important to be able to detect and to handle LED failure, incurring only a minimal down time.

In a typical signboard, the LEDs are arranged in small groups, with each group providing a picture element (pixel) in the image being displayed. Each pixel is capable of displaying a wide range ("gamut") of colors. Typically, each pixel[1] is made up of three kinds of LED. Each "kind" of LEDs may consist of a single LED, or a serially connected string of LEDs, providing a specific color of light ("primary color"). Popular LEDs provide red, green and blue lights. Light of a wide variety of colors and intensities may be produced from each pixel by properly controlling the intensity of light emitted from each kind of LED. The intensity of light emitted from each LED kind is controlled by the electrical current flowing through the LED. In addition, the human psycho-visual system is insensitive to light intensity changes that are more rapid than about 100 Hz. For these reasons, the typical driver for an LED, or for a string of serially connected LEDs, is made up of a current source that is pulse-modulated to produce two states: i.e., either having no current or a current of a reference value. The modulation rate is chosen so that the waveform has essentially no energy present below about 100 Hz. A duty cycle may be selected so that the average value of the current waveform over time provides the required light intensity from the LEDs. The desired duty cycle is stored in a counter that is preset by digital circuitry to correspond to the relative intensity desired from a particular kind of LED (e.g., red-emitting) within a pixel. The reference value $I_{ref}$ of the current is such as to provide a desired brightness for the entire image display consisting of many pixels.

[1] In the present description, a pixel may include one or more LEDs provided within a locality of the signboard to appear to a distant viewer as an illuminated point on the display. The LEDs forming the pixel may be addressed and programmed as a single unit, or as separate individual units.

For convenience in construction, installation and maintenance, a typical signboard organizes its pixels in groups, with each group being housed in a common structure or module. A group typically consists of hundreds to thousands of pixels. Sometimes, each group is further subdivided into many parts each consisting of a few to a few tens of pixels. However, since each color in each pixel must be controlled independently of all others, large amounts of data must flow to each group of pixels whenever a change is made in the image displayed on the advertising structure. To show a motion picture on such a structure would require the ability to handle a huge data flow rate. Contemporary signboards use many parallel wires to transfer the data and additional wires for control and monitoring functions. Consequently, a large number of connectors are required for interconnecting components. The cost and reliability of the connectors, the cost of manufacture and the cost of maintenance all suggest that alternative methods for accomplishing the interconnections are desirable.

As signboards are large outdoor structures, their exposed faces become dirty and must be cleaned to preserve the quality and appearance of the images shown. Additionally, particularly for structures exposed to strong sunlight, the faces may be also exposed to significant heat loads. Therefore, cleaning the faces and controlling the thermal environment can prolong the life and reduce repair and maintenance costs.

The entire set of colors that a light-emitting display is capable of showing is called its color gamut, which is a function of all primary colors that the light-emitting elements can produce. Typically, a set of LEDs may provide a gamut which produces images exceeding the gamut capability of the display system that generates or processes the images. As a result, the gamut available on a signboard may not be fully utilized. The images shown thus may not have the attention-capturing or aesthetic impact that would be possible if the gamut were more effectively utilized.

Further, in humans, color perception changes with the ambient lighting condition. A color perceived in a bright background looks different when the background brightness changes, so that some signboards may be difficult to read or an image appears to be of the wrong or unnatural colors under certain lighting conditions. Accordingly, a method for compensating for perceived color shift due to ambient light is desired.

SUMMARY

According to one embodiment of the present invention, a method to be used in a light emitting diode (LED) display provides a fault-healing capability. The method is applicable to a display having pixels made up of LEDs of four or more primary colors. For each pixel, the method receives a signal specifying a light intensity and a color to be displayed and detects if a fault exists in an LED of one or more of the primary colors. When no fault is detected, the LEDs of the pixel are driven with currents to achieve the specified light intensity and color. Otherwise, the LEDs of the pixel are driven in the primary colors that are without fault, using a combination of currents to achieve the specified light intensity and color. The combination of currents is derived by finding a position of the specified color in a chromaticity diagram and, using that position, deriving the currents to drive the LEDs in the primary colors without fault.

In one embodiment, redundant LEDs for one or more of the primary colors are provided. The redundant LEDs may be blue or red LEDs.

The present invention is better understood upon consideration of the detailed description below in conjunction with the accompanying drawings.

DETAILED DESCRIPTION OF THE PREFERRED EMBODIMENTS

According to one embodiment of the present invention, a fault in an LED or the wiring in a pixel may be circumvented. When a fault in either an LED or in the wiring is detected and located, the intensities of other LEDs in a pixel may be dynamically altered, so that the pixel can continue to function based on other functional LEDs in the pixel, despite the fault and until repair is performed. Under this arrangement, the pixel may function with little or no noticeable difference from the input (original) tristimulus value for the pixel. In this embodiment, each pixel may have 3 or more different kinds of LED, with each LED providing light contributing to providing the color specified by the input (original) tristimulus value for the pixel coordinate $(x_i, y_i)$. (The present detailed description follows the color coordinate convention of G. Wyszecki and W. Stiles, *Color Science: Concepts and Methods, Quantitative Data and Formulae,* 2$^{nd}$ Edition, John Wiley & Sons, Inc., New York (1982). See pages 130-248, especially 137-142, for a discussion of the CIE colorimetric system.)

Figure 1:
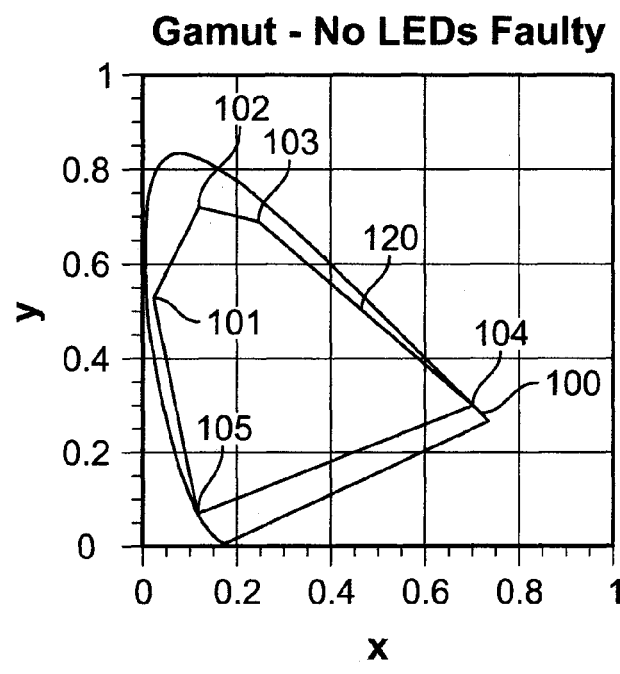
FIG. 1 shows area 100 defined by the boundary of the color gamut of the human psychovisual system, and illustrative, hypothetical color gamut 120 representing a color gamut that can be constructed from five (5) LED kinds, in accordance with one embodiment of the present invention.
Figure 2:
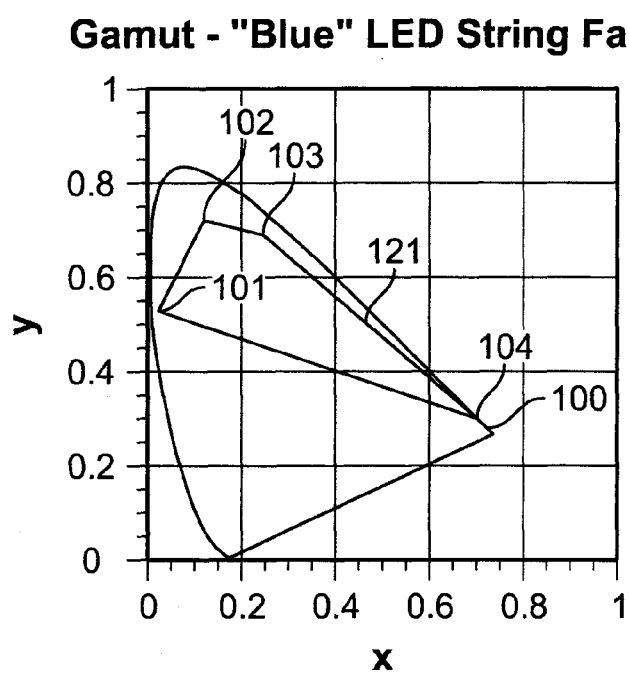
FIGS. 2-6 show resulting colors gamuts 121-125, when the blue LED, the blue-green LED, the green LED, the amber LED and the red LED fail, respectively.
Figure 3:
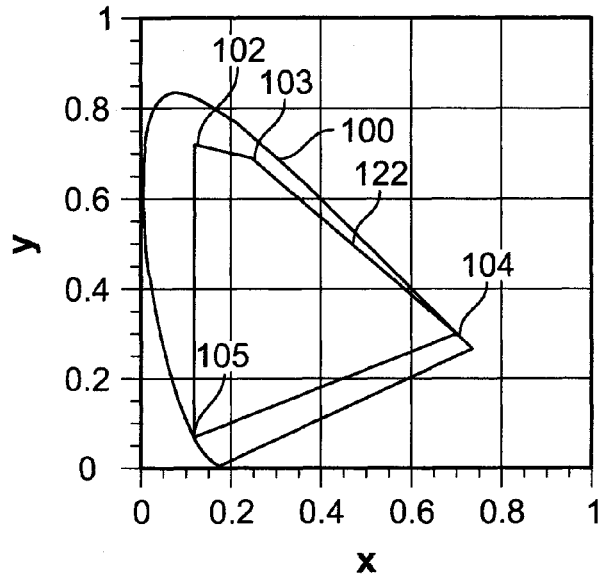
Figure 4:
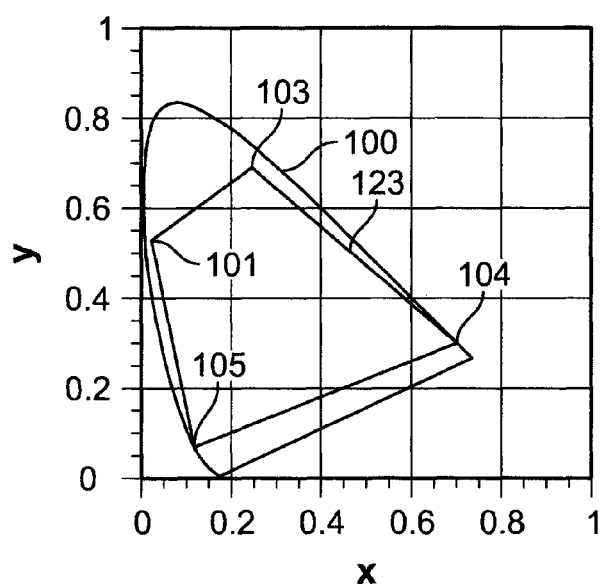
Figure 5:
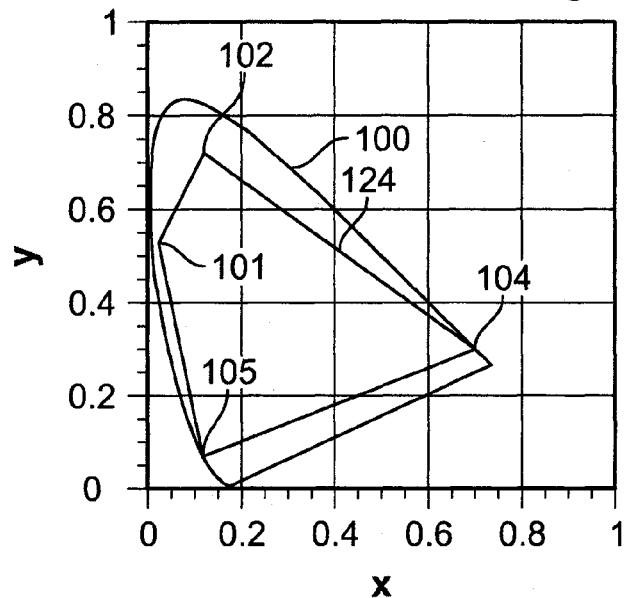
Figure 6:
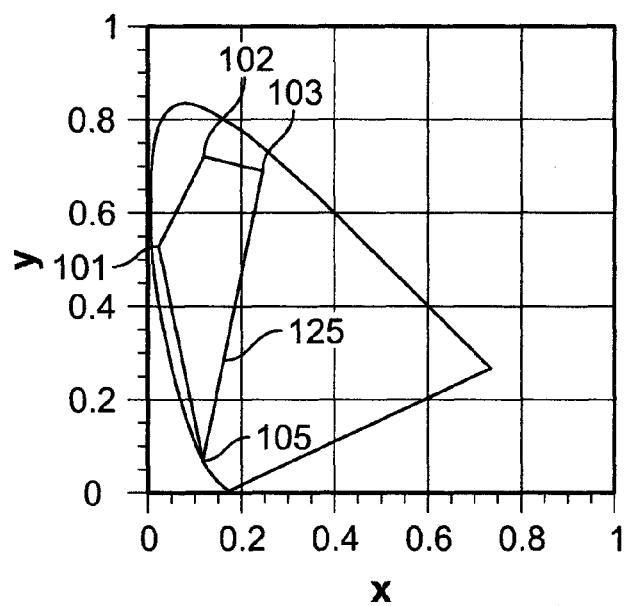

FIG. 1 shows area 100 defined by the boundary of the color gamut of the human psychovisual system (also known as the "CIE chromaticity diagram"), and illustrative, hypothetical color gamut 120 representing a color gamut that can be constructed from five (5) kinds of LED, in accordance with the present invention. At the boundary of color gamut 100, the oval-shaped curve is called the "spectral locus" and the straight line connecting the ends of the spectral locus is the "purple line". Points on the spectral locus each correspond to the color of a monochromatic (i.e., single-wavelength) light, with blue at the lower left, greens near the peak, yellow then orange on the downward sloping upper side and finally red at the rightmost end. Points on the purple line correspond to an additive mixture of monochrome blue and monochrome red light. Almost 100% of all colors perceived by the human psychovisual system are represented by points in the closed surface bounded by the spectral locus and purple line.

As shown in FIG. 1, color gamut 120 covers all colors that can be created using LEDs with colors at coordinate 101 ("blue-green LED"), 102 ("green LED"), 103 ("amber LED"), 104 ("red LED") and 105 ("blue LED"). All colors represented by the interior and boundary of the pentagon are available for display. FIGS. 2-6 shows the resulting colors gamuts 121-125 when exactly one of the 5 LED kinds fails. Namely, FIGS. 2-6 show resulting colors gamuts 121-125, when the blue LED, the blue-green LED, the green LED, the amber LED and the red LED fail, respectively.

According to one embodiment of the present invention, a pixel may be provided a sensor associated with each kind of LED (i.e., either a single LED or a serially-connected string of LEDs of that kind) in a pixel, such that a fault detector may indicate a fault in one kind of LED in the pixel (e.g., detecting a short or an open circuit in the LED or the LED string). When one kind of LED fails in a pixel with N kinds of LED, N−1 kinds of LED remain functional, so that the resulting gamut of colors available for that pixel has the lesser of 2 or N-2 dimensions. When N=3, the gamut is just one-dimensional (along the line joining the color coordinates of the remaining kinds of LED). If the desired pixel color $(x_d, y_d)$ does not lie within a just-noticeable-difference distance from the line connecting the color coordinates of the two remaining colors, no circumvention of the fault is possible. When N>3, the gamut may be two-dimensional. If the desired pixel color ($x_d$, $y_d$) lies within the convex hull formed by connecting the color coordinates of the N-2 remaining LED, then the fault may be circumvented by applying appropriate drives to the remaining LED kinds to create the desired pixel color ($x_d$, $y_d$), whenever the required brightness is within the capability of those remaining LEDs. Standard techniques from linear algebra may be used to find the set of luminances of the remaining, functional LEDs that will produce the desired pixel color and luminance. One method for calculating an LED drive for a desired pixel color using a constrained maximization approach is described in further detail below.

Figure 7:
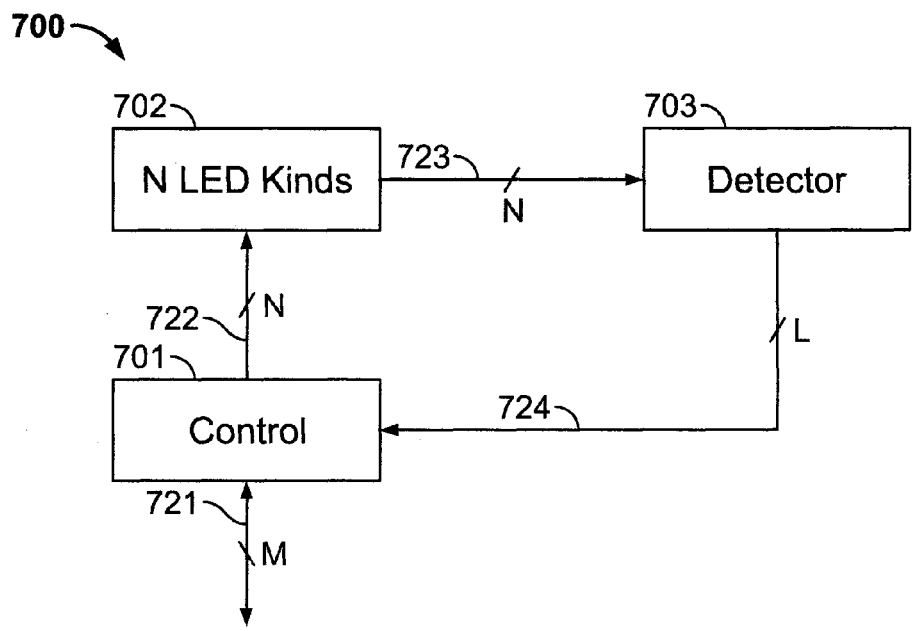
FIG. 7 is a block diagram showing illustrative pixel 700, according to one embodiment of the present invention.

FIG. 7 is a block diagram showing illustrative pixel 700, according to one embodiment of the present invention. As shown in FIG. 7, pixel 700 includes control module 701 receiving control signals 721 specifying the color coordinate of the desired color. Control module 701 also receives fault detection signals 724 from fault detector 703. When all LED kinds are operational, the control signals 721 are mapped into the N current signals 722 driving the N LED kinds of LEDs 702. If fault detection signals 724 indicate that one or more of the LED kinds is detected to be faulty, the control signals 721 are mapped into the appropriate current signals 722 driving the remaining LED kinds. The current of each LED kind is sensed and signals 723, representing the states of the LED kinds, are provided to fault detector 703. In a hierarchical control system, the status and fault information of the LED kinds, as detected by detector 703 may be provided along the control hierarchy to a control element (e.g., a CPU) at a higher control level. The suitable drive currents for the remaining LEDs may be calculated at this higher level control element, and may be provided to control module 701 to circumvent the fault conditions.

Notice that the color gamut is severely restricted if a failure occurs in either the blue LED or the red LED. Thus, in one embodiment of the present invention, redundant strings of red and blue LEDs are provided to minimize the risk of a pixel failure due to a failure of a single LED string.

According to one embodiment of the present invention, a gamut of the source images is mapped to the capability of the system using LEDs that have larger gamuts. An example of such a system includes those displays utilizing more than three primary colors. As explained above, the light intensities emitted from different LED kinds are each controlled by the short-term average of the electrical current through the LED. By adjusting the average current through each LED kind in a pixel, the precise adjustment through the entire range of colors and brightness is made possible. Using this technique, an image produced by an apparatus with a reduced color gamut may be shown on an image display that has a greater gamut. This gamut expansion can be performed using software, customized hardware or a combination of both hardware and software. When the human psychovisual system is taken into account in the gamut expansion procedure, impressive results (e.g., in an image with exceptional color richness) may be achieved. In the prior art, however, such an image may be displayed only with the colors of the reduced color gamut.

In mapping colors between color gamuts, the psychovisual system should be considered, as the human is particularly intolerant of misrepresentation of certain color groups (e.g., skin colors and logo colors used in advertising). Therefore, a gamut expansion in the vicinity of these colors requires special attention. The present invention provides this special attention as well as attention to continuity and gradient control in mapping between color gamuts. A gamut expansion changes the color, and, possibly, the luminance, of most pixels in the image to be displayed in a way that increases the perceptual quality of the image. The changes are preferably smooth (e.g., in CIE tristimulus space) and should preferably preserve the hue of the pixels. According to one embodiment, a parameter α controls the "amount" of gamut expansion. The gamut expansion may be represented by function $f$ (t, α) which maps an input tristumulus vector t into another tristimulus value (the output tristimulus vector), where α is a scalar that controls the amount of change (e.g., where the input and the output tristimulus vectors are desired to be the same, α=0).

When expanding a gamut, it is desirable to keep the same hue ("general color") but increase the chroma ("saturation"). For example, a "bleached" color would be mapped to a more "pure" color under such a procedure. Additionally, the chroma may be changed by an amount that depends on a and, possibly, the tristimulus value of the pixel under consideration. The tristimulus value dependency protects (i.e., allowing only small changes) certain hues, such as human skin or face colors. One method according to the present invention uses a map that provides a direction and magnitude for a unit change in chroma for any feasible tristimulus value. The total change at any chroma may then be calculated by integrating on the map (i.e., integrating the magnitude along the given direction), beginning at the input (i.e., original) tristimulus value for the pixel, until the desired amount of gamut expansion is reached for that pixel. Methods may be developed under any of a number of already known models that relate perceived colors and standard colorimetry.

Figure 12:
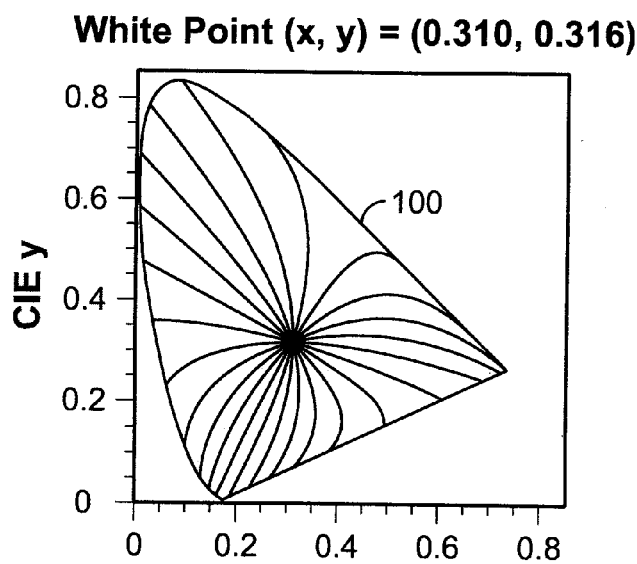
FIG. 12, is a CIE chromaticity diagram showing lines of perceived constant hue within area 100, which represents substantially all colors perceived by humans.

FIG. 12, is a CIE chromaticity diagram showing lines of perceived constant hue within area 100, which represents substantially all colors perceived by humans, as already described above. The color coordinate (0.310, 0.316) is an example of a "white point" corresponding to white (specifically, at CIE Illuminant C). As the constant-hue lines radiate outward from white near the center of the chromaticity diagram, the chroma increases until the constant-hue lines terminate on either the spectral locus (denoting monochromatic light) or the purple line, which connects blue and red.

Figure 13:
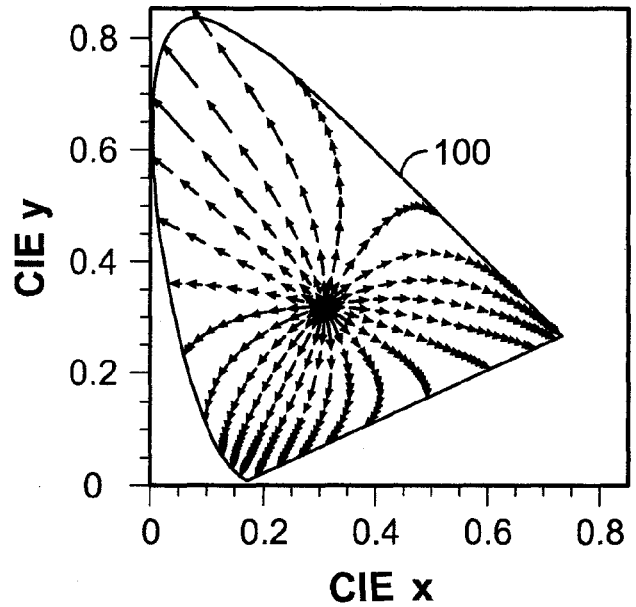
FIG. 13 shows small arrows representing the direction of increasing chroma, where the length of each arrow indicates the "distance" along a line of constant hue required to produce a unit of change in chroma.

FIG. 13 shows small arrows representing the direction of increasing chroma, where the length of each arrow indicates the "distance" along a line of constant hue required to produce a unit of change in chroma. FIGS. 12 and 13 are obtained using the Stiles model in the Wyszecki and Stiles text (mentioned above), discussed for example, at pages 670-672[2], based on extensive experiments on two-color thresholds. As one may see from the following discussion, the methods of the present invention are independent of the choice of model. Thus, other choices of models may be used to obtain similar results. As physiologists and others provide improvement in the models, the methods of the present invention can track and take advantage of these new models.

[2]Note that the definitions for the Christoffel symbols set forth on page 671 are incorrect. The correct definitions are $$[12, 1] = \frac{1}{2}\frac{\partial g_{11}}{\partial x^2} \text{ and } [22, 1] = \frac{\partial g_{21}}{\partial x^2} - \frac{1}{2}\frac{\partial g_{22}}{\partial x^1}$$

As seen from FIG. 12, for example, the lines (or sheets, if luminance dependence exists) of constant hue are curved in tristimulus space, and the lines (sheets) of constant chroma are therefore not uniformly spaced. Each choice of input pixel tristimulus vector t is on a line of constant hue. To find the output tristimulus value $f(t, \alpha)$ the arrow at t in FIG. 13 is followed until an amount of chroma change required by the value of $\alpha$ is achieved. The resulting position corresponds to the output tristimulus value $f(t, \alpha)$. Where the luminance is held constant, each line of constant hue may be uniquely specified by a single parameter (e.g., the initial angle of the line emanating from the cluster point). Thus, a line of constant hue that contains a given tristimulus vector t may be found in a map such as FIG. 12, by searching over lines of constant hue that cover the tristimulus space, and selecting the two lines that surround the point t. Bisection or any other suitable method may then be used to find the specific line containing t. Alternatively, if the luminance changes along the line on a sheet of constant hue, then two parameters are needed to select a line (on a sheet of constant hue). In that case, the search is then over the set of the two parameters and standard techniques may also be used for conducting the search.

On a digital computer, to realize a good approximation to $f(t, \alpha)$, a tradeoff exists between execution speed and memory requirements. Thus, numerous implementations are possible. Many operations required to expand the gamut are repetitive and independent of the real-time data. These operations need be performed once ("pre-processed"), with their results stored in a data structure that provides access during real-time operation. With such preprocessing, significant reduction in the quantity of operations required in real-time results, reducing the calculation cost and time. In each of these methods, gamut expansion is performed on a pixel-by-pixel basis. Input to the expansion algorithm is a tristimulus representation of the original color and intensity. Output of the expansion algorithm is a tristimulus representation of the expanded color and intensity.

According to one embodiment, a look-up table may be constructed for each choice (of a set of discrete values) of $\alpha$, indexed by the input tristimulus value. Each entry in the look-up table is populated by the output tristimulus value or, more directly, the current required to drive the LED strings contained in the pixel to reproduce the color of the output tristimulus value. For example, if the input is the CIE L*a*b value from a typical TIFF image format, then 24 bits are used to describe the tristimulus value and, hence, the look-up table would have 224 (i.e., 16,777,216) entries. If five colors are used as primary colors in a pixel, and each color requires 16 bits (i.e., two 8-bit bytes) for its luminance description, then $5 \times 2 \times 2^{24} = 167,772,160$ bytes of storage are required for each choice of $\alpha$. Therefore, a few gigabytes of storage could be required for an extensive lookup table that would provide a direct mapping from an input pixel value to a drive value for each of the primary colors used in a pixel. Using look-up tables provides the fastest way to perform the mapping, as such an approach requires only a few memory fetch operations per pixel, making it feasible for real-time display of a motion picture.

Alternatively, a "uniform color space" representation may be used for the input and the output tristimulus values, so that the integration for the gamut expansion may be carried out using a linear transformation. Examples of a uniform color space include the CIE L*a*b* and the CIE L*u*v representations. There are also other uniform color spaces that may be used. Under this method, a look-up table indexed by the input tristimulus vector t provides a pointer to a data structure. The data structure holds the individual components of two vectors t and v expressed in the uniform color space. Vector v is a unit vector representing the direction along the line or sheet of constant hue. Each of the vectors t and v may have two or three components, depending on whether luminance is kept constant during the chroma expansion. Each element of the data structure may therefore be of the form $(a, b, v_a, v_b)$ or $(L, a, b, v_L, v_a, v_b)$. Thus for a desired gamut expansion of $\Delta s$ color difference units in the uniform color space (i.e., $(\Delta s)^2 = (L_1 - L_2)^2 + (a_1 - a_2)^2 + (b_1 - b_2)^2$, for two color points 1 and 2). A color difference unit of one (1) represents the minimum perceptible color difference. Using the values from the data structure, the output tristimulus value is provided by $t + (\Delta s) v$, which is then rounded and trimmed, if required. Such a look-up table has 224 entries. Thus, approximately 256 or 384 megabytes are necessary to hold the table and the data structures, depending on whether luminance is kept constant in the expansion, and assuming that each of the components is expressed as an 8-bit value. The storage requirement may be halved, if the values of L, a and b are not stored, but are obtained by other means (e.g., computing the transformation). Under this method, a few tens to a few hundreds machine operations are required per pixel.

One transformation preserves hue while changing saturation of the resulting color. The mapping is given by:

$$a_2 = (1+\gamma)a_1$$

$$b_2 = (1+\gamma)b_1$$

$$L_2 = f(L_1, \gamma)$$

This transformation preserves hue as $\gamma$ is changed. $\gamma$ is related to the change parameter a discussed above, except that $\gamma$ is a quantity in the uniform color space. By selecting $f(L_1, 0) = L_1$, the transformation provides no change when $\gamma = 0$. Generally, function $f$ allows luminous intensity varies with $\gamma$. $f$ is usually a smooth function in both L and $\gamma$. If $f$ is constant for a given $\gamma$, independent of luminance L, $(\Delta s)^2 = (a_1 - a_2)^2 + (b_1 - b_2)^2$, i.e., $\Delta s$ depends only on $a_i$ and $b_i$.

Under this transformation, $$(\Delta s)^2 = \left\{ \left( \frac{f(L_1, \gamma) - L_1}{\gamma} \right)^2 + a_1^2 + b_1^2 \right\} \gamma^2$$

Approximating the quotient by the derivative obtained by letting $\gamma$ approach zero, then $$\gamma = \frac{\Delta s}{\left[ \left( \frac{\partial f(L_1, 0)}{\partial \gamma} \right)^2 + a_1^2 + b_1^2 \right]^{\frac{1}{2}}},$$

where positive square root has been chosen, such that $\gamma$ increases with $\Delta s$. Values $v_a$, $v_b$ and $v_L$ may be given by:

$$v_a = \frac{a_1}{\left[ \left( \frac{\partial f(L_1, 0)}{\partial \gamma} \right)^2 + a_1^2 + b_1^2 \right]^{\frac{1}{2}}}$$

$$v_b = \frac{\Delta s}{\left[ \left( \frac{\partial f(L_1, 0)}{\partial \gamma} \right)^2 + a_1^2 + b_1^2 \right]^{\frac{1}{2}}} \text{ or}$$

-continued $$v_L = \frac{\frac{\partial f(L_1, 0)}{\partial \gamma}}{\left[\left(\frac{\partial f(L_1, 0)}{\partial \gamma}\right)^2 + a_1^2 + b_1^2\right]^2}$$

Hence, $$a_2 = a_1 + (\Delta s)v_a$$

$$b_2 = b_1 + (\Delta s)v_b$$

$$L_2 = L_1 + (\Delta s)v_L$$

Note that protection of certain colors, as discussed above, may be accomplished by multiplying the values of $v_a$, $v_b$ and $v_L$ each by a constant that is less than one. If luminance does not change with $\gamma$, $v_L = 0$ and $L_2 = L_1$. Then only two components are needed for each term in the data structure.

Hence, by storing the values of the $v_a$, $v_b$ and $v_L$ for each possible choice of the triplet $(L_1, a_1, b_1)$, repetitive calculations are avoided and evaluation of the output requires only lookup and a few arithmetic operations.

Yet another alternative, according to one embodiment of the present invention, provides a preprocessing step that constructs, from a list of values of vector t along each of a set of constant hue lines, (i) a first interpolation function, given by $t = f_1(\theta, s)$, where $\theta$ is the initial angle (or two angles, if the luminance changes along a line of constant hue) and s is the distance along the line or sheet of constant hue measured in units of constant chroma, and (ii) a second interpolation function, given by $(\theta, s) = f_2(t)$, the second interpolation function being constructed by sampling t to produce a list of $\theta$ and s as a function of the components of vector t.

To find the output tristimulus value $t_{out}$ from the input value $t_{in}$, a pair $(\theta, s)$ is obtained using the second interpolation function $f_2(t_{in})$. The output (expanded) tristimulus value $t_{out}$ is then obtained using the first interpolation function $t_{out} = f_1(\theta, s + \Delta s)$, where $\Delta s$ corresponds to the desired shift in chroma and which is linearly related to the change parameter $\alpha$ described above. This method would require tens to hundreds of thousand machine operations per pixel, mostly to evaluate the two interpolation functions $f_1$ and $f_2$.

Figure 14:
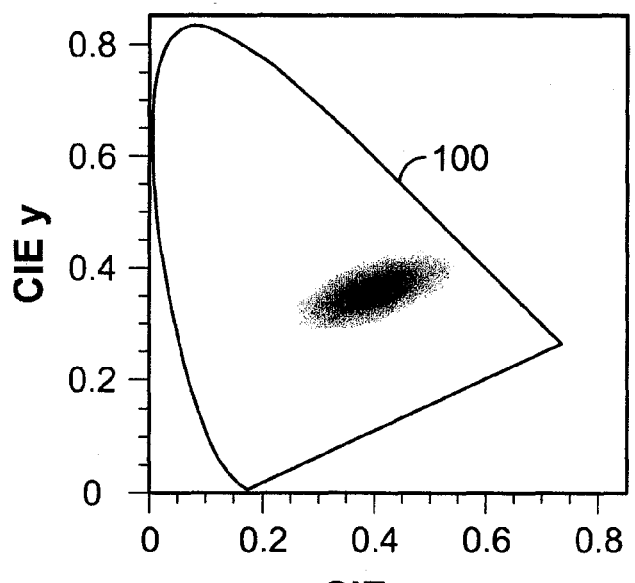
FIG. 14 shows a map of such a function that reduces the value of α in the vicinity of colors usually associated with face colors.

As explained above, it is desirable to limit gamut expansion of certain ranges of colors, such as skin colors. One method provides a function that gives the value of $\alpha$, as a function of the input tristimulus value, so that colors in or near the protected colors are provided a lesser $\alpha$. FIG. 14 shows a map of such a function that reduces the value of $\alpha$ in the vicinity of colors usually associated with face colors. Depending on the detail of the map, the value produced by the map at a given pixel may be combined additively, multiplicatively or with some other composition on the nominal choice of $\alpha$ used for gamut expansion of the image.

Images that are to be displayed on a signboard using LEDs are typically provided by a system having a smaller color gamut than that available using LEDs. The present invention, by any of the gamut expansion methods discussed above, thus provides a way to more effectively utilize the color gamut available in an LED display. Significant improvement in the perceived image quality of images that are designed or processed in a system capable of only a smaller color gamut is thereby achieved.

The present invention provides a method for an image display that compensates for ambient light. In an LED-based signboard of the present invention, sensors are provided to measure the ambient light, or the light provided by a pixel or a group of pixels. The light measurements are provided as input to photometric equations which describe the desired intensity and the color of a pixel under the measured ambient or lighting conditions. The equations are then solved for the luminous intensity required for each LED kind in the pixel. This calculation is repeated for every pixel in the display.

Suppose the desired primary color stimuli for a given pixel, as expressed in the tristimulus colorimetric system, are $(X_d, Y_d, Z_d)$ for a given pixel, and the primary stimuli for the ambient light are $(X_a, Y_a, Z_a)$, the following basic colorimetric equations apply to the additive color mixture:

$$X_a + \sum_{p=1}^{P} b_p X_p = X_d$$

$$Y_a + \sum_{p=1}^{P} b_p Y_p = Y_d$$

$$Z_a + \sum_{p=1}^{P} b_p Z_p = Z_d$$

Where the display includes P different LED kinds, wherein the p-th LED kind provides light with the primary stimuli $(X_p, Y_p, Z_p)$ at maximum luminance. The variable $b_p$ $(0 \leq b_p \leq 1)$ provides a linear luminance control for each of the P LED kinds. The equations may be rewritten in vector matrix notation as follows:

$$Ab + v_a = v_d,$$

$$\text{where } A = \begin{bmatrix} X_1 & \cdots & X_p & \cdots & X_P \\ Y_1 & \cdots & Y_p & \cdots & Y_P \\ Z_1 & \cdots & Z_p & \cdots & Z_P \end{bmatrix},$$

$$b = \begin{bmatrix} b_1 \\ \cdots \\ b_p \\ \cdots \\ b_P \end{bmatrix}, v_d = \begin{bmatrix} X_d \\ Y_d \\ Z_d \end{bmatrix} \text{ and } v_a = \begin{bmatrix} X_a \\ Y_a \\ Z_a \end{bmatrix}$$

When a set of non-negative values $b_1, b_2, \ldots, b_P$; $(0 \leq b_p \leq 1)$ are found for the above equations, given A, $v_a$ and $v_d$, a realizable, exact set of luminous intensities are found, such that compensation for the ambient light is achieved. An approximate solution is required when no set of non-negative values $\{b_1, b_2, \ldots, b_P; 0 \leq b_p \leq 1\}$ is found.

The present invention provides an algorithm for solving the above equations exactly, when possible, and otherwise provides an approximate solution that is nearest to the desired perceived pixel color.

It is convenient to map the CIE XYZ system to an approximately uniform color space—i.e., a space in which perceptual color difference is approximately the same for equal position differences in the color space. Suppose the one-to-one mapping from CIE XYZ space to the approximately uniform space is the function U where the domain and the range each consist of three-dimensional vectors. As discussed above, the L*a*b color space is an example of a uniform color space. Other approximately uniform color space may also be chosen. Define functions $f$ and $g$ as follows:

$$f = \begin{cases} u^{1/3} & \text{if } u > 0.008856 \\ 7.787u + (16/116) & \text{otherwise} \end{cases}$$

$$g = \begin{cases} 116v^{1/3} - 16 & \text{if } u > 0.008856 \\ 903.3v & \text{otherwise} \end{cases}$$

Then, representation in the L*a*b color space for a given CIE XYZ (X, Y, Z) value is given by:

$$U\left(\begin{bmatrix} X \\ Y \\ Z \end{bmatrix}\right) = \begin{bmatrix} g(Y/Y_n) \\ 500[f(X/X_n) - f(Y/Y_n)] \\ 200[f(Y/Y_n) - f(Z/Z_n)] \end{bmatrix}$$

where white at maximum luminous intensity is given by the triple $(X_n, Y_n, Z_n)$ in the CIE XYZ color space and the appropriate norm $\|*\|$ is the square root of the sum of the squares of the components of its argument. For example, if the XYZ triple is changed from $t_1$ to $t_2$, then $\|U(t_1) - U(t_2)\|$ is the amount of perceived change in the light.

According to one embodiment of the present invention, the perceived difference in the light actually available at a pixel and the light that is desired is minimized. Let P be the proposition that a set of values $b_p$, $0 \leq b_p \leq 1$, exists that satisfy $Ab + v_a = v_d$, and S be a given condition to be minimized when P is true. The follow algorithm finds the best pixel color:

Algorithm A:
If P then minimize S constrained by $Ab + v_a = v_d$, and $0 \leq b_j \leq 1$;
Otherwise, find arg $\min(\|U(v_d) - U(Ab + v_a)\|)$ subject to $0 \leq b_j \leq 1$.

In either case, using the values $0 \leq b_p \leq 1$ found in Algorithm A provides the luminous intensities for the LED kind for each pixel.

Depending on the design of the sensors, it is useful to be able to do ambient light compensation in several different circumstances. In one embodiment, the ambient background light may be directly measured (e.g., measured using a spectrophotometer or a colorimeter that gives $v_a$ directly). For example, the ambient light may be measured occasionally with the signboard switched off briefly (e.g., less than 30 milliseconds). Alternatively, a background reference reflector may be provided near or within the sign to measure the ambient light reflected from it, The measured value of can then be used as input to Algorithm A to calculate the required luminous intensities of the LEDs to accomplish compensation for the chroma shift due to the ambient light.

According to one embodiment of the present invention, indirect measurement of the background light is accomplished by measuring the color of a pixel or a group of pixels while the sign is displaying colored objects. The measured color is then used in conjunction with the known desired color $v_d$ in the measurement region of interest to calculate the ambient background $v_a$. The value of $v_a$ is then used as input to Algorithm A.

The CIE xyz chromaticities are values related to the CIE tristimuli XYZ values by:

$$x = \frac{X}{X + Y + Z}$$

$$y = \frac{Y}{X + Y + Z}$$

$$z = \frac{Z}{X + Y + Z}$$

from which, the following relationships may be derived:

$$X = x\frac{Y}{y}$$

$$Z = z\frac{Y}{y}$$

$$x + y + z = 1$$

Consider measurements made at more than one pixel or pixel group, each measurement being represented by vector $$v_m^k = \begin{bmatrix} X_k \\ Y_k \\ Z_k \end{bmatrix},$$

where index k indicates that the measurement is made at the k-th pixel or pixel group. Accordingly, the error of the measurement is given by $v_m^k - (v_d^k + v_a)$, or in the CIE xyz representation: $e^k = \alpha_k c^k - (v_d^k + v_a)$, where $$c^k = \begin{bmatrix} x_k \\ y_k \\ z_k \end{bmatrix}$$

denotes the measured color at the k-th pixel or pixel group, and $$\alpha_k = \frac{Y_k}{y_k}$$

is the scalar multiplier. The ambient tristimulus value $v_a$ is assumed to be the same at all pixels. Note that $\alpha_k$ is an inferred value, since the luminance $Y_k$ is not measured in the color measurement. Since $c^k$ has three components, there are therefore 3K equations for K distinct measurements and K+3 unknowns. The K+3 unknowns are the three components of $v_a$ and the K $\alpha_k$'s. A weighted least squares method may be used to estimate the K+3 unknowns and their covariances. Note that the error $e^k$ does not take into consideration that human perceptual errors are not uniform over all values of $e^k$. Mapping the values of $e^k$ to a uniform color space (e.g., CIE L*a*b) resolves the difficulty. An error in the uniform color space to be minimized over $\alpha_k$, for k= 1, . . . , K and the three components of $v_a$ may be, for example:

$$\varepsilon = \sum_{k=1}^{K} \|U(\alpha_k c^k - v_a) - U(v_d^k)\|^2$$

A Taylor series expansion of the transformation function U about the point $V_d^k$ provides an approximation $\tilde{\varepsilon}$ of the error $\epsilon$. Let the 3×3 matrix $J_k$ represents the derivative of U with respect to $$\begin{bmatrix} X \\ Y \\ Z \end{bmatrix},$$

evaluated at the point $v_d^k$. The approximation $$\tilde{\epsilon} = \sum_{k=1}^{K} \|J_k e^k\|^2$$

approaches exactly the squared-error in CIE L*a*b color space as the errors become small. The same results may be obtained for any other uniform color space that has a continuous derivative at point $v_d^k$. The approximation can also be written in the form:

$$\tilde{\epsilon} = \sum_{k=1}^{K} \|J(Bx-u)\|^2,$$

where $$x = \begin{bmatrix} v_a \\ \alpha_1 \\ \cdots \\ \alpha_k \\ \cdots \\ \alpha_K \end{bmatrix}$$

is a (K+3)-dimensional vector, $$u = \begin{bmatrix} v_d^1 \\ \cdots \\ v_d^k \\ \cdots \\ v_d^K \end{bmatrix}$$

is a 3K-dimensional vector, and $$J = \begin{bmatrix} J_1 & 0 & 0 & 0 & 0 & 0 & 0 \\ \cdots & \cdots & \cdots & \cdots & \cdots & \cdots & 0 \\ 0 & \cdots & \cdots & 0 & \cdots & \cdots & \cdots \\ 0 & \cdots & 0 & J_k & 0 & \cdots & 0 \\ 0 & \cdots & \cdots & 0 & \cdots & \cdots & 0 \\ \cdots & \cdots & \cdots & \cdots & \cdots & \cdots & \cdots \\ 0 & 0 & 0 & 0 & 0 & 0 & J_K \end{bmatrix}$$

is the block-diagonal 3K×3K transformational matrix carrying all the tristimulus error to the uniform color space. The 3K×(K+3) matrix B is defined as $$B = \begin{bmatrix} -I & c^1 & 0 & 0 & 0 & 0 & 0 & 0 \\ -I & 0 & c^2 & 0 & \cdots & \cdots & \cdots & 0 \\ -I & 0 & 0 & \cdots & \cdots & \cdots & \cdots & 0 \\ \cdots & \cdots & \cdots & \cdots & \cdots & \cdots & \cdots & \cdots \\ -I & 0 & \cdots & \cdots & 0 & \cdots & \cdots & \cdots \\ -I & 0 & \cdots & 0 & c^k & 0 & \cdots & 0 \\ -I & 0 & \cdots & \cdots & 0 & \cdots & \cdots & \cdots \\ \cdots & \cdots & \cdots & \cdots & \cdots & \cdots & \cdots & \cdots \\ -I & 0 & \cdots & \cdots & \cdots & \cdots & 0 & 0 \\ -I & 0 & \cdots & \cdots & \cdots & 0 & c^{K-1} & \cdots \\ -I & 0 & 0 & 0 & 0 & 0 & 0 & c^k \end{bmatrix},$$

where I is the 3×3 identity matrix.

The value x that minimizes the error approximation $\tilde{\epsilon}$ may be found in numerous ways. One approach is to solve the set of linear equations $(B' J' JB)\hat{x} = (B' J' J)u$. A generally more satisfactory approach is to use a singular value decomposition, which provides $\hat{x} = (JB)^+ Ju$, where $(\bullet)^+$ denotes the Moore-Penrose[3] inverse. However, $(JB)^+$ is usually not explicitly calculated. Rather a sequence of transformations are used to calculate $\hat{x}$. If $v_a$ is not small compared with $v_d^k$, then error $\epsilon$ is minimized using a direct minimization method that minimizes $\epsilon$ over all $v_a$ and $\alpha_k$. In that case, the approximate solution for $\tilde{\epsilon}$ may serve as a starting point for iterations.

[3] See, for example, Adi Ben-Israel et al., *Generalized Inverses—Theory and Applications*, Wiley International Series on Pure and Applied Mathematics, p. 7.

Independently of how the minimization is done, the actual error $\epsilon$ may be obtained by substituting the resulting x into the equation for the error $\epsilon$. The square-root of $\epsilon$ is the error in the selected uniform color space. Also, the first three elements of vector x are the components of vector $v_a$, which may be used in Algorithm A to obtain the drive vector $b_k$ and the tristimuli vector Ab associated with LEDs for individual pixels.

Thus, ambient light compensation allows the maintenance of uniform quality of the observed images as the ambient light reflected back from the signboard changes, particularly during the daytime with direct sunlight. The above description are applicable to systems where three or more primary colors are available at each pixel. The range of compensation increases with the number of primary colors (preferably, four or more primary colors). Moderate computational resources are needed for tracking sunlight when the image latency is a few seconds. Motion pictures could require signicant computational resources for high-quality compensation.

Figure 8:
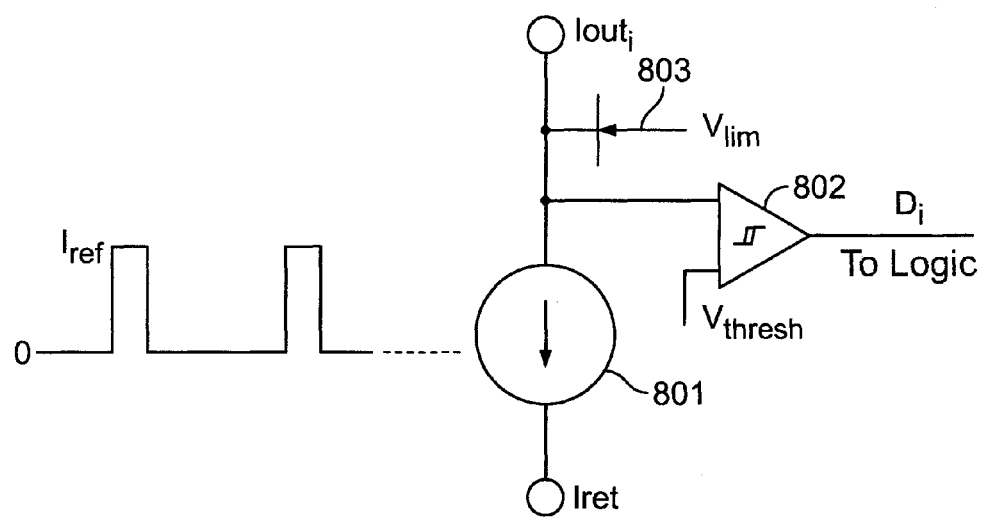
FIG. 8 illustrates one detection method that is suitable for implementing in fault detector 703.

The present invention also provides rapid detection and location of LED failures on the signboard, which enhance the overall sign reliability and reduce time and cost to repair. One detection method that is suitable for implementing in fault detector 703 is shown in FIG. 8. As shown in FIG. 8, current driver 801 provides a current at terminal Iout$_i$ to drive the i-th output line provided to an LED or an LED string. I$_{ret}$ is the common current return terminal. Terminal Iout$_i$ approaches a limiting voltage V$_{lim}$, when terminal Iout$_i$ is terminated in an open circuit or a very high resistance. Voltage V$_{lim}$ is set such that no current flows through detector diode 803 when the LEDs in the LED string are operating at maximum current. Current driver 801 is controlled by a pulse-width modulation signal with amplitude $I_{ref}$ and a specified duty cycle. The control parameters for the current may be specified by an external control module in a register.

According to one embodiment of the present invention, a voltage threshold detector (e.g., voltage threshold detector 802) is provided to each of the $Iout_i$ lines. When the voltage at terminal $Iout_i$ is below voltage threshold $V_{thesh}$, which is set to a value just above $V_{lim}$, voltage threshold detector 802 asserts signal $D_i$ to indicate that an open circuit (or a high resistance) is detected. Thus, asserted signal $D_i$ indicates the presence of a fault (e.g., an open circuit) between the sense point at terminal $Iout_i$ and return terminal Iret. Signal $D_i$ may be fed into an encoder receiving signals $D_i$ of each of the N LED kinds in a pixel. The value of encoder output $E_{out}$ indicates which, if any, LED strings (or connecting wires) in the pixel are faulty. The encoder outputs of for all pixels may be organized (e.g., hierarchically) by further logic circuit to allow unique location of all faults in the LED kinds of all pixels in the signboard.

Figure 15:
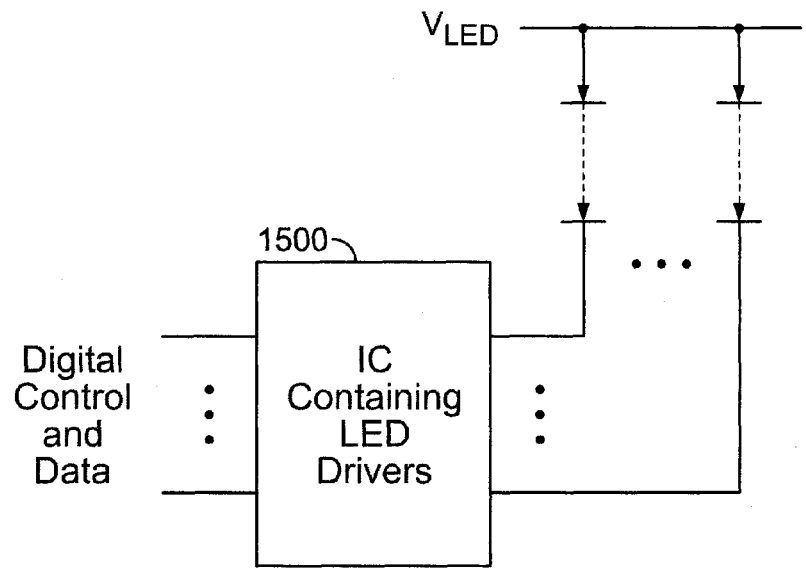
FIG. 15 shows an integrated circuit 1500 including several current sources, connected to a number of LED strings.

In applications that require a sustained high-quality display, it is desirable to measure the technical characteristics of the light produced by individual and groups of pixels without interrupting the content that is being displayed (e.g., the advertisement being displayed on the signboard). The methods of the present invention provide additional benefits of sensing the ambient light reflected from the display, as well as detecting and locating faulty LEDs, when present. FIG. 15 shows an integrated circuit 1500 including several current sources, connected to a number of LED strings. The voltage $V_{LED}$ is selected to be sufficiently high to provide a voltage offset for operation of the on-off pulse-width modulated current sources. As discussed above, the modulation rate is chosen such that the waveform has essentially no energy present below about 100 Hz and the duty cycle is selected such that the average value of the waveform provides the required light intensity from the LEDs.

According to one embodiment of the present invention, a different image from that perceived may be displayed for a very short duration on the LED display without an observer's notice. Such a brief image may be used, for example, for diagnostic purpose. The images that may be displayed in this manner include a test image for a) calibration of color and luminance, b) sensing the ambient light reflected from the display or c) detecting and determining locations of faulty LEDs. While a suitable driver circuit (e.g., the Texas Instrument integrated circuit TLC5911) typically has an open-circuit detector (OCD) available for each string of LEDs, short-circuits and other malfunctions of an LED cannot be detected by the OCD. A direct detection of the light output, or its absence, is preferable for detecting these faults.

To avoid being noticed by an observer, the duration of the diagnostic output does not exceed about 10 milliseconds, and the diagnostic image should be placed adjacent temporally to images with similar luminosity. If no buffering other than the normal double buffer (i.e., while the image in one buffer is being displayed, another image is being received into a second buffer), the display must have the bandwidth for receiving more than 100 different complete frames per second. Without using a lossy compression (undesirable for high-quality displays), the required bandwidth represents a data rate of many gigabits per second for even a modest display dimension.

According to one embodiment of the present invention, the high communication data rate requirement may be avoided by storing the test image or images at the display controller or within the LED drivers. By displaying an image of the brief duration that selectively activates predetermined LED strings, for example, the activated LED strings may be tested during that brief duration. If a short circuit is detected, using the method discussed above with respect to FIG. 8, for example, existence of a faulty LED string is detected without interrupting the advertising program being displayed. In addition, light sensors may be placed to detect the luminance of the LEDs that are selectively activated. The light sensors can also be used to sense ambient light when the test image switches off all pixels of the signboard.

Figure 16:
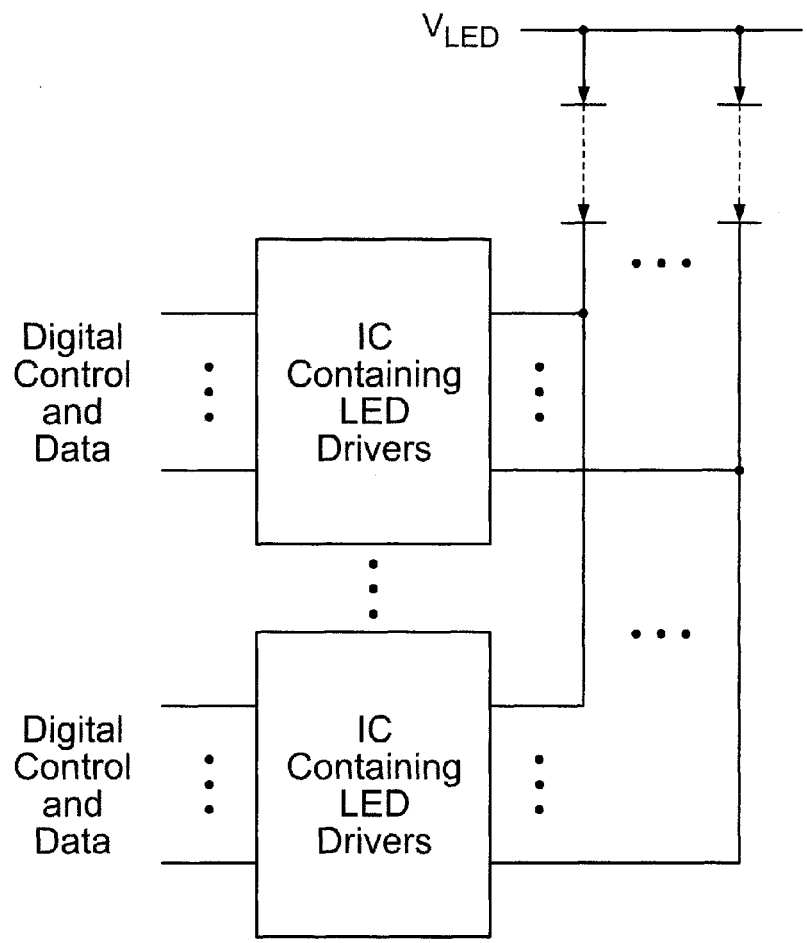
FIG. 16 illustrates using parallel redundant LED drivers, with one of the parallel current sources active at a time, to avoid service interruption.

Additionally, the method switches on redundant drivers to avoid service interrupt when a local driver failure is detected. Since the typical LED drivers use switched current sources, the preferred method is to provide parallel current sources, with one of the parallel current sources active at a time, as shown in FIG. 16. When one of LED driver is found defective, the redundant parallel driver may be activated. In addition to status indication and fault detection, the methods disclosed can also be used to sense ambient light reflected from the display as well as detect and determine the exact location of faulty LEDs.

As discussed above, having more than three colors (e.g., five) of LED allows the same psychovisual color and luminous intensity to be achieved by any of several different luminosity combinations in the LEDs of a pixel. One approach for calculating the LED drive required to achieve a given color and luminous intensity finds the maximum luminous intensity $\hat{Y}$ at each color within the gamut. For on-line use, the maximum luminous intensity $\hat{Y}$ at each color may be interpolated from sampling points selected from the gamut. Only the quantity and specification of each LED string used to produce a basis color are required for this calculation. The calculation of maximum luminous intensity $\hat{Y}$ at each color may be carried out off-line and stored away. During run time, to display a desired color (e.g., calorimetric coordinates (x, y)), the desired color is input to the interpolation function, which returns the previously calculated maximum luminous intensity $\hat{Y}$ and the associated LED drive vector $\hat{b}$. The required luminous intensities for the desired color and luminous intensity may be scaled (e.g., linearly) at run time. A model for the calorimetric equations may be provided by:

$$\sum_{p=1}^{P} b_p X_p = X$$

$$\sum_{p=1}^{P} b_p Y_p = Y$$

$$\sum_{p=1}^{P} b_p Z_p = Z$$

where (X, Y, Z) is the desired color in the tristimulus CIE XYZ representation, and the p-th of P kinds of LED specified by $(X_p, Y_p, Z_p)$ at maximum luminosity. In vector notation, these equations may be written as Ab=v, where A is the matrix of basis color specification $$\begin{bmatrix} X_1 & \cdots & X_p & \cdots & X_P \\ Y_1 & \cdots & Y_p & \cdots & Y_P \\ Z_1 & \cdots & Z_p & \cdots & Z_P \end{bmatrix},$$

b is the drive vector $$\begin{bmatrix} b_1 \\ \cdots \\ b_p \\ \cdots \\ b_P \end{bmatrix},$$

and v is the color vector $$\begin{bmatrix} X \\ Y \\ Z \end{bmatrix}.$$

As discussed above, these equations can also be represented in the CIE xyz chromaticity coordinate system as constraint $C_1(Y)$:

$$Ab = \frac{Y}{y}\begin{bmatrix} x \\ y \\ 1-x-y \end{bmatrix}.$$

In one embodiment, A has the value $$\begin{bmatrix} 2.8971 & 0.3816 & 0.6580 & 0.9143 & 5.9733 \\ 1.56 & 2.2 & 2.92 & 2.56 & 2.56 \\ 17.8286 & 1.9082 & 0.5346 & 0.1829 & 0 \end{bmatrix}$$

(rounded), for a five basis color gamut.

A second constraint is that the drive vector includes only non-negative $b_p$ values, $0 \le b_p \le 1$. In other words, $C_2$: $0 \le b \le 1$. $\hat{Y}$ and $\hat{b}$ may be obtained by solving constraint equations: $\hat{Y}$, $\hat{b} = \{Y \ge \hat{Y}, b | C_1(Y), C_1(\hat{Y}), C_2\}$. These equations may be solved using linear programming. Let $A_i$ denote the i-th row of matrix A. First, solving for Y in one of the rows, for example, the second row, substituting Y in the other rows:

$$A_2 b = Y$$
$$\left(A_1 - \left(\frac{x}{y}\right)A_2\right)b = 0$$
$$\left(A_3 - \left(\frac{1-x-y}{y}\right)A_2\right)b = 0$$

Then, maximize $A_2 b$ (i.e., finding $A_2 b = \hat{Y}$) subject to $$\left(A_1 - \left(\frac{x}{y}\right)A_2\right)b = 0$$
and
$$\left(A_3 - \left(\frac{1-x-y}{y}\right)A_2\right)b = 0; 0 \le b \le 1.$$

Solving the linear programming problem may be carried out off-line. Points within the gamut may be interpolated between from points computed in this manner. If the desired color (x, y) is not a point within the gamut, its color may be provided by the point at the intersection of a line of constant chromaticity and the boundary of the gamut between the achromatic point and (x, y).

The present invention also provides a method for handling high data rates, while minimizing the quantity of interconnecting wires and cables required. A conventional signboard or advertising structure is organized using a hierarchy of electrical and electronic components. Drivers for the LED strings are usually arranged at the level of sub-groups or groups of pixels because a number of drivers may be provided in an integrated circuit, with each integrated circuit accommodating a few tens of LED strings. Such conventional hierarchical data distribution systems are expensive and unreliable.

According to one embodiment of the present invention, rather than directly connecting from a central control unit to the pixel groups, networking techniques are applied to convey control and pixel data to the pixel groups. Grouping of pixels at the integrated circuit level constitutes the lowest-level opportunity for networking, as the interfaces at that and higher levels are mostly digital, except for power distribution. Network techniques may be applied at any of the digital levels. Many network topologies are possible, so that scalability and distributed control and data processing may be achieved.

Figure 9:
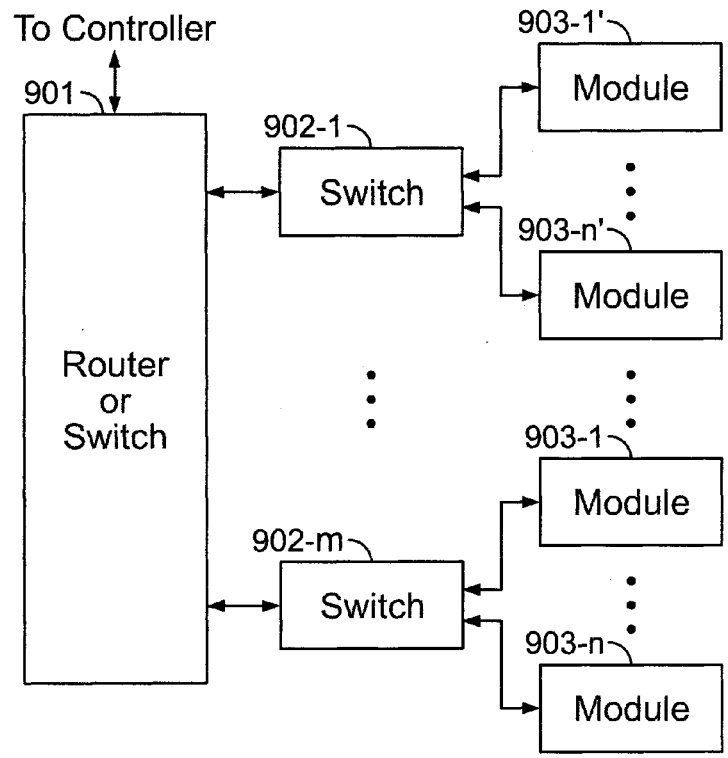
FIG. 9 shows an illustrative interconnection using router or switch 901 to group together a set of switches 902-1 to 902-$m$, each of which connects to a set of modules 903-1 to 903-$n$ containing multiple pixel groups, in accordance with one embodiment of the present invention.
Figure 10:
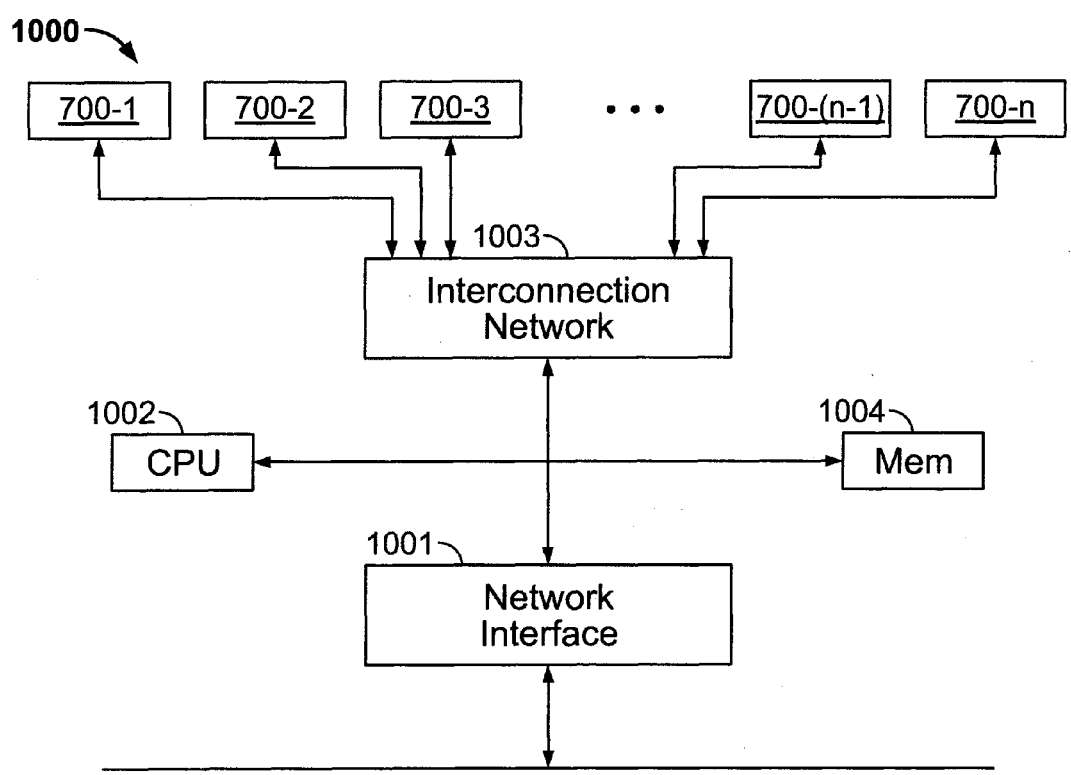
FIG. 10 shows one implementation of a module, in accordance with the present invention.

FIG. 9 shows an illustrative interconnection using router or switch 901 to group together a set of switches 902-1 to 902-m, each of which connects to a set of modules 903-1 to 903-n, each containing multiple pixel groups, according to one embodiment of the present invention. Each module is individually addressable using a network address (e.g., an IP address). Control, data, status and faults are all communicated over the network using conventional network protocols (e.g., IP protocol). In one embodiment, a signboard is divided into 32 groups of modules, with each group having up to 32 modules, thereby allowing 32×32=1024 modules to be addressed. FIG. 10 shows implementation 1000 of a module (e.g., module 903-1), in accordance with the present invention. As shown in FIG. 10, network interface 1001 connects module implementation 1000 to a network switch (e.g., any of network switch 902-1 to 902-m), microprocessor or controller 1002 drives the pixels in the group of sub-group of pixels through interconnection matrix 1003. (Each of these pixels may be implemented, for example, by pixel 700 shown in FIG. 7.) The interconnection matrix 1003 also allows microprocessor 1002 to send and receive extensive status determination and fault detection signals from the pixels. Remote indication of status and diagnosis of faults is also greatly facilitated by embedded computers, such as microprocessor 1002. Alternatively, image processing functions may also implemented in microprocessor 1002, thus allowing scaling of the signboard to handle very large amounts of video and image data (e.g., full-motion surround imagery and many other large-scale image displays).

The network of the present invention, including any distributed computational structures, may be implemented by off-the-shelf standard components. Standard protocols may be used for communication over the network and standard software and firmware may be used to provide internal and external interfaces to the physical network, providing reliability and reduction in cost. For example, the IP "stack" including TCP, RTP, UDP, NTP and other associated protocols provides broad functionality for communications needed in the signboard (e.g., for controlling the LEDs), while ethernet or SONET/SDH can be used to provide link-level control and data transfer. Optical fiber, wire cables or wireless can be used for the physical connection.

During manufacture and in operation, positions of the LEDs must be controlled to small tolerances to ascertain uniformity of the resulting images on the display. The enclosure for each module, for example, is typically provided by a polymer molding with holes for the LEDs. Such an enclosure experiences large heat loads, as the enclosures have low reflectivity and, particularly on outdoor structures, may be subjected to direct sunlight for extended periods of time. Solar heat loads up to about 1000 watts per square meter of surface area are possible on the face of the structure. The polymer moldings are typically made of polymers that have low thermal conductivity and low thermal capacity. Thus, the temperature in an enclosure can become high quite rapidly and would fluctuate as the heat load changes. Temperature fluctuations produce mechanical expansion and contraction stresses on the enclosure, causing misalignment and relative movement of the pixels, which results in concomitant loss of image uniformity. Temperature uniformity and constancy improve accuracy and precision of colors displayed. Mechanical fatigue caused by repeated stresses can also produce broken connections and other electrical continuity problems, which reduce the reliability and, potentially, the useful lifetime of the display system. Additionally, the external face of the sign accumulates dirt and debris that can reduce the light output, increase reflectivity, shift the color balance and produce other deleterious effects.

Therefore, maintenance of a signboard requires both effective cleaning and cooling of the signboard. These functions may be performed independently of each other. According to one embodiment of the present invention, the sign face may be cleaned frequently by flowing a fluid over the sign face, or by providing a jet of fluid at the sign face. Typically, the sign face is not a simple flat surface. The LED lens, LED protective covering, louvers to provide shade on the sign face, and other deviations from a flat surface may be desirable or exist. A laminar fluid flow covering the entire sign face may not be possible or may not be adequate to ensure proper cleaning. Instead, jets consisting of one or more cleaning fluids may be used for cleaning in many circumstances. The jets may be placed on a scaffold with rails which allows the jets to slide along a horizontal or vertical direction, or both. The jets can be generated in many ways. One method uses compressed air to provide a motive force to force a liquid through directed nozzles. The fluid may be collected, filtered and recirculated to minimize fluid loss.

As an additional benefit from frequent fluid flow over the sign, temperatures and temperature fluctuations can be reduced significantly. Fluid may also be circulated in conduits installed in the sign to provide a purely cooling function. Without the need to perform the cleaning function, the fluid conduits may be closed (e.g., in pipes).

Although laminar fluid flow covering the entire sign face may not be possible, fluid flow to parts of the sign face provide moderation of temperature fluctuations. For example, fluid flow over or across louvers[4] associated with each row, or every few rows, of pixels is sufficient if the thermal conductance to the louvers is sufficiently high. Use of heat wicks, heat pipes or thin sheets of material with high thermal conductivity distributes the heat to near the surface of the face where fluid flow can remove the heat, thereby moderating temperature fluctuations.

[4] In this embodiment, louvers are provided for shading from incident sunlight to reduce reflectivity of the signboard. The louvers are not required to effectuate cleaning or cooling of the signboard.

Figure 11:
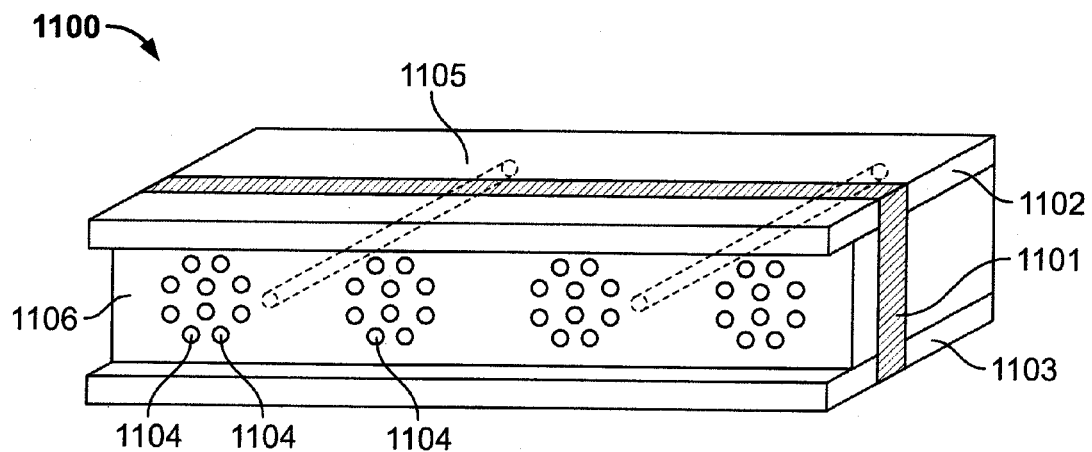
FIG. 11 shows enclosure 1100 for a module with fluid flow capability, in accordance with one embodiment of the present invention.

FIG. 11 shows enclosure 1100 for a module with fluid flow capability, in accordance with one embodiment of the present invention. As shown in FIG. 11, enclosure 1100 includes a first face 1106 in which a group of LEDs are placed behind transparent windows or lens 1104. (Face 1106 forms part of the graphical display of the signboard.). FIG. 11 shows enclosure 1100 including 4 pixels, with each pixel having 10 elements. In one implementation, each pixel includes 5 red LEDs, 3 blue LEDs and 2 green LEDs. Each enclosure is designed to be a building block of the signboard, capable of being stacked vertically and placed adjacently and horizontally relative to each other. The pixels are positioned in each module at specific locations such that, when the enclosures are stacked vertically or placed horizontally, all adjacent pixels are equidistantly separated from each other, regardless of whether the adjacent pixels are in the same enclosure or in different enclosures. Face 1106 may be formed as a laminar structure consisting of a thin layer (e.g., a few millimeters) of polymer and thin metal mesh 1101. The polymer layer is chosen to provide low reflectivity in the visible band (about 380 to 720 nm wavelength), low water absorbance, resistance to the weather and ultraviolet exposure and good mechanical properties. Thin metal mesh 1101 of high thermal conductivity is provided as a heat wick a short distance behind face 1106 as a collector of the thermal load incident on first face 1106. Metal mesh 1101 is selected to have a differential temperature coefficient consistent with the polymer material of face 1106, and capable of providing a good thermal bond thereto. A number of heat wicks or heat pipes (e.g., heat pipe 1105) are provided behind metal mesh 1101 to conduct heat away from metal sheet 1101 towards the back side of enclosure 1100. Typically, air conditioning is provided at the back side for moisture and temperature control. In this embodiment, fluid conduits are provided in top wall 1102 and bottom wall 1103 for circulating a cleaning fluid. Top wall 1102 may provide a louver that overhangs face 1106.

Perforations opening to the fluid conduits of top wall 1102 may be provided along the louver so that a stream of the cleaning fluid may flow substantially in a laminar flow over face 1106. Alternatively or in addition, the cleaning fluid may be provided, for example, by nozzles placed at regular intervals, or which move along vertically or horizontally running conduits provided along the dimensions of the signboard, so that jets of cleaning fluids may be directed to face 1106 of each enclosure in the signboard. The cleaning fluid is preferably one that does not leave behind a film on face 1106. The stream of cleaning fluid is collected in a gutter in bottom wall 1103, which empties into fluid conduits that direct the cleaning fluid into a reservoir where the cleaning fluid is filtered and recycled. The fluid flow also provides temperature moderation that reduces thermally-induced stress, thus promoting greater lifetime for the LEDs and associated electronics with resulting reduced service and maintenance costs. If the cooling function is not necessary for a given sign board (e.g., due to its location), cleaning may be performed relatively infrequently.

Many of the mechanical, fluid control and distribution components needed for cleaning are common to those needed for temperature moderation. Significant cost savings are therefore realized by integrating the design and realization of the means for providing both cleaning and temperature moderation for the signboard.

Assuming a solar heat load of 1000 watts per square meter, some temperature gradients and differentials may be estimated. Since the thermal conductivity of most of the polymers is about 0.3 $wm^{-1}K^{-1}$, about a 3° C. temperature differential exists across each millimeter thickness of the laminar material used in face 1106. Using a heat wick consisting of 60-mesh (60 wires per inch) copper screen as thin metal sheet 1101 provides a temperature gradient of about 3° C. per centimeter of linear lateral length from the heat sink connection to the copper screen. As a result, using a thin heat wick (e.g., a copper screen) will provide good temperature stability if the distance between heat sink connections does not exceed up to about ten centimeters. Spacing between heat- or cold-sink connections may be increased as the thermal conductance is increased by, e.g., using multiple layers of screen or solid sheets of material with high thermal conductivity. Alternatively, using active or gravity-feed heat pipes (e.g., heat pipes 1105) provide a mechanism to move heat over greater distances with, however, increase in complexity.

Embedding heat wicks, heat pipes, or both within an enclosures for the LEDs in the modular structure typically containing a few to a few hundred pixels moderates the temperature changes resulting from exposure to direct sunlight or extreme cold.

The detailed description above is provided to illustrate specific embodiments of the present invention and is not intended to be limiting. Numerous modifications and variations within the scope of the present invention are possible. The present invention is set forth in the following claims.

I claim:

1. A method for fault-healing in a light emitting diode (LED) based display, comprising:
   providing in each pixel of the display LEDs of four or more primary colors and diagnostic circuitry for electrically detecting fault in the LEDs of the pixel; and
   for each pixel,
   (a) receiving a signal specifying a light intensity and a color to be displayed by the pixel;
   (b) using the diagnostic circuitry of the pixel, detecting if a fault in the form of an open circuit exists in an LED of one of the primary colors;
   (c) when no fault is detected, driving the LEDs of the pixel with currents to achieve the specified light intensity and color; and
   (d) upon detecting the fault, driving the LEDs of the pixel in the primary colors without fault with currents to achieve the specified light intensity and color.

2. A method as in claim 1, further comprising providing redundant LEDs for one or more of the primary colors.

3. A method as in claim 2, wherein the redundant LEDs are blue LEDs.

4. A method as in claim 2, wherein the redundant LEDs are red.

5. A method as in claim 1, further comprising finding a position of the specified color in a chromaticity diagram and computing the currents to drive the LEDs in the primary colors without fault in accordance with the position found.

6. A method as in claim 5, wherein the chromaticity diagram comprises a polygon formed by the primary colors not associated with the fault.

* * * * *